US006321707B1

(12) United States Patent
Dunn

(10) Patent No.: US 6,321,707 B1
(45) Date of Patent: Nov. 27, 2001

(54) MULTIFUNCTION AUXILIARY VEHICLE POWER AND STARTER SYSTEM

(76) Inventor: James Dunn, 60 Prescott St., Worchester, MA (US) 01605

(*) Notice: Subject to any disclaimer, the term of this patent is extended or adjusted under 35 U.S.C. 154(b) by 0 days.

(21) Appl. No.: 09/438,248

(22) Filed: Nov. 12, 1999

Related U.S. Application Data

(60) Provisional application No. 60/108,269, filed on Nov. 12, 1998, and provisional application No. 60/151,234, filed on Aug. 27, 1999.

(51) Int. Cl.[7] .................................................... F02N 11/08
(52) U.S. Cl. ...................... 123/179.3; 290/36 R; 290/50; 320/104
(58) Field of Search .............................. 123/179.1, 179.3, 123/179.28; 290/27, 36 R, 50; 307/10.6, 10.7; 320/104, 105

(56) References Cited

U.S. PATENT DOCUMENTS

| | | | |
|---|---|---|---|
| H1172 | * 4/1993 | Gorniak | 290/50 |
| 4,004,208 | * 1/1977 | Tamminen | 320/104 |
| 5,555,864 | * 9/1996 | Miyakawa et al. | 123/179.1 |
| 5,993,983 | * 11/1999 | Rozon | 429/9 |

FOREIGN PATENT DOCUMENTS

| | | | |
|---|---|---|---|
| 2 136 224 A | * 9/1984 | (GB) | 290/38 R |
| 5-44614 | * 2/1993 | (JP). | |

* cited by examiner

Primary Examiner—Andrew M. Dolinar
(74) Attorney, Agent, or Firm—Fish & Associates, LLP

(57) ABSTRACT

A vehicle power and starter system for use in operating a motor vehicle has a first battery that is electrically coupled to a starter and a plurality of electric loads, and a second battery that is electrically coupled to the starter and electrically isolated from the electric loads in the vehicle, wherein both the first and the second batteries are charged by the power source.

15 Claims, 2 Drawing Sheets

MULTIFUNCTION AUXILIARY VEHICLE POWER AND STARTER SYSTEM

This application claims the benefit of U.S. provisional application No. 60/108,269 filed Nov. 12, 1998, and U.S. provisional application No. 60/151,234 filed Aug. 27, 1999, each of which are incorporated herein by reference in its entirety.

FIELD OF THE INVENTION

The field of the invention is DC power systems for use in starting motor vehicles, boat engines, tractor engines, industrial engines, generators and other applications where high current auxiliary DC power is required for short durations to augment or replace the standard starting battery.

BACKGROUND OF THE INVENTION

It is unfortunately a relatively common experience among many operators of motor vehicles that a well maintained, or even new internal combustion engine can not be started when the battery that supplies the power to the starter is discharged below a minimum power level needed to crank the engine. While in many cases an external power source is employed, internal supplementary power sources find increasing utility to provide auxiliary power to start the engine.

Internal supplementary power sources that operate in addition to a main battery may be broadly grouped into one of two classes. One class of internal power sources comprises capacitor-based systems and employ mostly commonly high capacitance double-layer capacitors. Double-layer capacitors typically combine small size with the ability to be charged in a relatively short time, and are therefore especially advantageous in internal supplementary power sources. For example, in U.S. Pat. No. 5,207,194 to Clerici, and U.S. Pat. No. 5,146,095 to Tsuchiya et al., a double-layer capacitor is employed to provide (boost) current to start an internal combustion engine, wherein a main battery charges the capacitor. However, when the capacitor and main battery are discharged to a level not sufficient to start the engine (e.g. due to prolonged non-operation of the vehicle), the capacitor may disadvantageously turn into an additional drain of the main battery. Moreover, electrical degradation or structural damage of the main battery, which may eventually result in insufficient power to start the engine, may concomitantly prevent the capacitor from being charged, thereby rendering the capacitor useless as a second power source.

To circumvent at least some of the problems associated with a battery charged capacitor, Nagao describes in U.S. Pat. No. 5,818,115 a configuration in which an engine starter has a built-in generator that charges the capacitor. Nagao's main battery is independently charged via an alternator, and supplies electricity to loads other than the starter. Although this arrangement affords independence of the capacitor from the battery as well as from the alternator, a specialized engine starter with a generator is needed, which often requires re-engineering of the existing engine starter. Moreover, the engine cannot normally be started in case of a capacitor failure, since the main battery is not electrically connected to the starter.

A second class of internal supplementary power sources comprises battery-based systems, typically employing customary lead-acid batteries. One of the most common configurations utilizing battery-based internal power sources is found in recreational vehicles (RVs) or boats, wherein the electric circuitry for lighting and utilities are separated from the engine starter, and wherein both circuitries are operated by independent batteries. The use of dedicated circuitries generally prevents even an inexperienced person from accidentally discharging the engine battery, but does not usually allow a second battery to boost or substitute for power of the main battery. Other configurations (see e.g. U.S. Pat. No. 5,555,864 to Miyakawa et al.) include dual battery arrangements wherein a source control device temporarily connects two batteries when an engine is started, but otherwise electrically separates the two batteries into an engine-dedicated battery and a utility-dedicated battery. Although the available battery capacity is temporarily doubled during starting in this configuration, the use of an additional similar size battery generally adds significant weight to the vehicle, and requires considerable space. Furthermore, since both batteries are connected to the same electric circuitry, they may share the same fate in an undesired discharge or short circuit event. In still another configuration, (U.S. Pat. No. 5,563,454 to Araki et al.) a main battery charges a smaller subsidiary battery, which is then used to drive a starter motor. The use of a smaller subsidiary battery generally reduces the space requirements of a second battery, however, an accidentally discharged main battery cannot charge the subsidiary battery, especially after a longer period of non-activity, and the subsidiary battery may therefore be discharged to the same extent as the main battery, and cannot be easily recharged without starting the engine or using suitable high current external power sources.

Despite various internal battery backup and support systems, all, or almost all of them suffer from one or more disadvantages. Therefore, there is still a need to provide methods and apparatus for a reliable auxiliary vehicle power and starter system, particularly one that can also be quickly removed for use in starting other engines or vehicles.

SUMMARY OF THE INVENTION

The present invention is directed to a vehicle power and starter system for use in a motor vehicle having an on-board power source, a starter, and a plurality of electrical loads other than the starter, wherein a first is electrically coupled to the starter and a plurality of electric loads, while a second battery is electrically coupled to the starter, and electrically isolated from electric loads other than the starter. The on-board power source charges both the first and the second batteries.

In one aspect of the inventive subject matter, the first battery is an ordinary lead battery while the second battery is preferably a high capacity battery, more preferably a thin metal film battery, and most preferably a bank of 6 thin metal film batteries with a total capacity of 5 A-hr at 12V.

In another aspect of the inventive subject matter, the starter system comprises a high current connector having a first contact and a second contact, wherein the first contact is electrically coupled to the second battery, and the second contact is electrically coupled to the starter. The second battery and the first contact are preferably enclosed in a housing, which may enclose additional elements, including a solenoid and/or a control circuit, both electrically coupled to the second battery.

In one especially contemplated configuration, a housing encloses the second battery, a solenoid, a control circuit and the first contact, forming an auxiliary power storage device. Such auxiliary power storage device may be removably coupled to a first motor vehicle via the connector and an optional harness, and may be transferred to a second motor vehicle to assist in starting an engine in the second motor vehicle. Alternatively, the auxiliary power storage device can be easily and quickly removed from the initial installation to be recharged externally or used to start another engine with a simple mating connector assembly.

Various objects, features, aspects and advantages of the present invention will become more apparent from the following detailed description of preferred embodiments of the invention, along with the accompanying drawings in which like numerals represent like components.

DETAILED DESCRIPTION

As used herein, the term "power source" refers to any device that provides electrical power. For example, an alternator, a battery, a capacitor, or a wall outlet is considered a power source under the scope of this definition.

As further used herein, the term "electric load" refers to any device that consumes electrical energy. Especially contemplated electric loads are electric loads commonly found in motor vehicles, boats, or planes, including starters, communication devices such as transceivers, stereos, cellular phones etc., light sources, fluid pumps, heaters, coolers, and so forth.

As also used herein, the term "starter" refers to an electric motor that is used to start a combustion engine, and the term "start cycle" refers to the temporary operation of the starter engaged with an internal combustion engine that will—in normal operation—result in starting of the internal combustion engine.

As still further used herein, the term "motor vehicle" refers to a self-propelled machine that carries at least one operator or passenger, and especially includes automobiles, motorcycles, semiand full-size trucks, recreational vehicles, all-terrain vehicles (ATV), boats with an internal combustion engine, and planes with an internal combustion engine.

Figure 1:
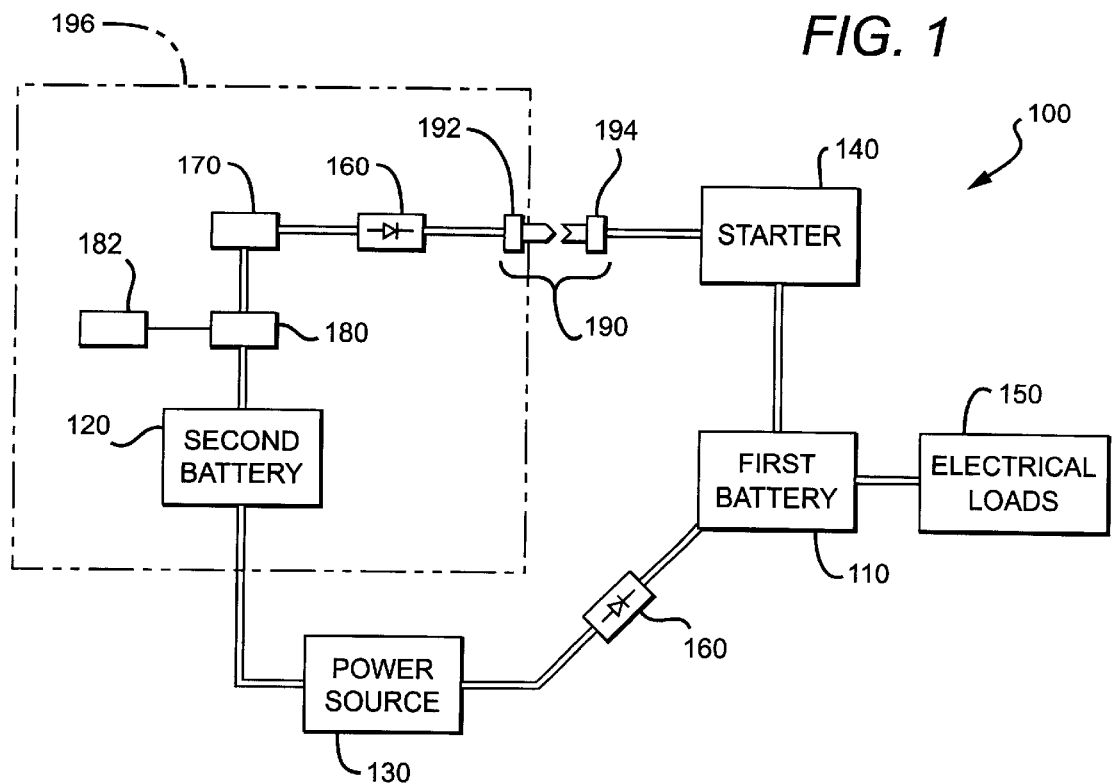
FIG. 1 is a schematic of one power and starter system according to the inventive subject matterr.

In FIG. 1 a vehicle power and starting system 100 has a first battery 110 and second battery 120, wherein both the first and second batteries are electrically coupled to the power source 130. While the first battery is electrically coupled to the starter 140 and electric loads 150, the second battery is electrically isolated from electric loads other than the starter via current flow control means 160. Located between the second battery and the starter is an optional high current switch 170, and an optional solenoid 180, which is electrically coupled to a control circuit 182. Connector 190 has a first contact 192 electrically coupled to the second battery 120, and a second contact 194 electrically coupled to the starter. Housing 196 (in phantom) encloses the second battery, the first contact, the solenoid, the current flow control means, the high current switch, and the control circuit.

In a preferred embodiment, the first battery is a regular 12V automobile battery with a capacity of 35–60 A-hrs, which is electrically coupled to the starter and other electric loads in the vehicle. The second battery is a bank of 6 serially connected thin metal film battery cells (2 Volts each) with a total capacity of 1–10 A-hrs, which is electrically coupled to the starter and electrically isolated from electric loads other than the starter. The term "thin metal film battery cell" as used herein refers to a battery that employs a thin metal film electrode wrapped up in a spiral cylinder with a special glass mat or similar separator, saturated with an electrolyte. The housing is a polyethylene casing completely enclosing the second battery and partially enclosing the first contact. The connector is a plug-type high current (i.e.>10 Amp) connector, wherein the first contact comprises a male contact and the second contact comprises a female contact. The power source is a standard alternator or generator electrically coupled to a rectifier and voltage regulator to produce a suitable voltage for recharging the batteries, typically 14–15V for 12V systems. The electric loads are engine electronics, fuel pump, light sources, and various other electric energy consuming devices. The current flow control means are typically a diode, or a switch. The solenoid, control circuit, starter, and high current switch are standard parts and well known to the art of automotive electrics.

In alternative aspects of the inventive subject matter, the second battery may comprise more or less than six TMF cells depending on the required voltage and/or capacity. For example, five or less than five TMF cells may be used where lower voltages are desired, including 1 to 4 TMF cells for 6V vehicles. Consequently, where voltages higher than 12V are desired seven or more TMF cells may be serially connected. For example, a 24V battery bank may comprise 12 serially coupled cells. Likewise, where higher currents are required, two or more than two banks of TMF cells may be connected in parallel. Other configurations may include alternative battery chemistries, including Nickel- Cadmium, Nickel-Zinc, Nickel-Metal Hydride, Lithium-Ion, or even employ super-capacitors. In general, configurations are contemplated that provide between 10 and 600 Amps of starting current at 6, 12, 24, 28 and 36V, however, due to the modular nature of a battery bank employing TMF cells many alternative configurations are also appropriate. Such alternative configurations include configurations providing starting currents of 50–300 amperes, or less at voltages between 2V–100V, but also configurations providing starting currents of 300–2000 amperes, or more at voltages between 2V–100V.

With respect to the capacity of the second battery, it is contemplated that various capacities other than 1–10 A-hr are also appropriate, particularly for diesel and turbine engines. Although it is generally preferred that the capacity of the second battery is sufficient to allow between 1 and 10 start cycles, more than 10 start cycles are also contemplated, including 11–15 start cycles, 15–30 start cycles, 30–50 start cycles, and more than 50 start cycles on a single charge. Especially in applications, where space or weight is not a limiting parameter (e.g. a full size truck), higher capacities for the second battery are deemed appropriate, including capacities between 5–20 A-hrs, 20–50 A-hrs, 50–200 A-hrs, and more than 200 A-hrs. In contrast, where space and weight are limiting factors (e.g. in automobiles or airplanes), it may be desirable to limit the capacity to less than 9 A-hr, including 2.5 A-hr, 1 A-hr, and less. It is still further contemplated that more than one second battery may be employed in the vehicle power and starter system. Additional batteries may advantageously extend the capacity when connected in parallel to the second battery, but may also be utilized to increase the voltage where appropriate.

It should also be appreciated that various battery types and power storage devices other than TMF cells are contemplated, so long as alternative batteries have a specific energy of higher than about 15 Wh/kg, can be recharged within about 30 minutes or less, and are able to provide peak currents of more than 100 amperes.

It is especially contemplated that the second battery or power storage device can be exclusively charged by the power source, and that the second battery can be electrically isolated from electrical loads other than a starter, particularly when the engine is not operating. This configuration is contemplated to render the second battery independent from the charge status or integrity of the first battery, which is particularly advantageous when the first battery is discharged below a level that would prevent starting the engine. Even with a completely discharged first battery, the second battery will likely be able to deliver sufficient current to the starter to effectively start the engine. Furthermore, due to the limited capacity and fast charging characteristics of the contemplated second battery, partial or complete recharging of the second battery can be achieved in a period of less than 30 min, preferably less than 20 and even more preferably less than 10 min.

It should further be appreciated that a housing may at least partially enclose the second battery and the first contact, and that the housing may enclose completely or partially additional elements, including a solenoid, and a control circuit. A preferred housing is a substantially rigid polymer casing surrounding the second battery and the first contact, which may have various shapes or forms, so long as the first contact on the housing is still able to matingly connect with the second contact. It is also contemplated that the housing may include mounting means to attach the housing temporarily or permanently to the motor vehicle. Contemplated means include brackets, loops, belts, locks, protruding elements, holes or slots, etc. Alternatively, the housing may be affixed to the motor vehicle by a harness into which the housing is inserted. It is especially contemplated that when the first contact is an integral part of the housing, the first contact automatically matingly connects with the second contact of the connector when the housing is affixed to the harness or the motor vehicle.

With respect to the solenoid it is contemplated that the solenoid is electrically coupled to the second battery, and may open and close an electrical circuit between the second battery and the starter, or first battery. With respect to the control circuit it is contemplated that appropriate control circuits may control the flow of electric energy into and/or out of the second battery. For example, contemplated control circuits may control charge currents to recharge the second battery. Alternatively, some control circuits may disable the solenoid when the voltage of the second battery drops below a predetermined level, while other control circuits may prevent accidental discharge of the second battery when the second battery is not electrically coupled to the second contact of the connector, or is removed from the mating harness for external usage.

In further alternative aspects of the inventive subject matter, the connector need not be limited to a high current plug-type connector, but may include various alternative shapes and forms so long as alternative connectors comprise a first contact that is removably coupled to a second contact, and so long the first contact is electrically coupled to the second battery and the second contact is electrically coupled to the starter, or the first battery. The term "removably coupled" as used herein means that the first and the second contact can be repeatedly connected and disconnected without destroying the connector. For example, a power plug and a corresponding wall outlet are removably coupled, because both plug and outlet can be connected and disconnected without destroying the connector. In contrast, the first and second contact of a wire cannot be connected and disconnected without cutting—and thereby destroying—the wire. Consequently, alternative connectors may include twist- or screw-type connectors, etc. The term "matingly connected" as used herein generally means that at least a portion of the first and second contact have a shape that is complementary to each other, and that such portions are in physical contact with each other. For example, the first contact may comprise a copper rod having a first radius, and the second contact may comprise ring shaped receptacle with a second radius, wherein the first and second radius are dimensioned such that the rod slidingly fits into the receptacle, thereby allowing physical contact of the first and second contact.

In cases where the housing encloses the second battery and the first contact, and optionally the solenoid and/or the control circuit, it is contemplated that the housing, second battery and the first contact, and optionally the solenoid and/or the control circuit form an independent auxiliary power storage device, which may conveniently be removed from the motor vehicle. It should especially be appreciated that the independent auxiliary power storage device may be utilized in various motor vehicles. For example, contemplated motor vehicles include an aircraft, a passenger vehicle, a tractor, a boat, motorcycle, snowmobile, and a truck. The use of the independent auxiliary power storage device in more than one motor vehicle is particularly advantageous, because a user may be able to switch the device from his passenger vehicle to a boat, or a truck.

With respect to the current flow control means it should be appreciated that various devices other than a diode, relay, or solenoid may also be utilized so long as the alternative current flow control means allow to isolate the battery from electric loads in the vehicle other than the starter, particularly when the engine is not operating. Therefore, appropriate current flow control means may also include a switch, IGBT, or a transistor.

Although it is preferred that in a vehicle power and starter system according to the present inventive subject matter the second battery is permanently electrically coupled to both the starter and the power source, various alternative configurations are also contemplated, including configurations with a manual or automatic switch, charge control devices, visual or other indicators for charge status, activity, etc. For example, in cases where the second battery is installed as a backup system after the vehicle is purchased, and only occasional use is anticipated, a manual high current switch (e.g. plug-type or screw-type) may be installed in line between the starter and the second battery. Alternatively, where the second battery is predominantly utilized to extend the life span of the first battery, an automatic switch (e.g. a solenoid) may be included to connect the starter to the second battery. This automatic switch may then be activated by an engine starting circuit to provide electric current from the second battery to the starter, every time the engine is started. It is especially contemplated that when the second battery is permanently connected to the power source, a control circuit controls the charge current in dependence of the charge status of the second battery. Such control circuit may be based on a temperature gradient during charging, or on the measurement of the charge current into the second battery, or the voltage of the second battery, and many charge control devices are known to the art.

In further alternative aspects of the inventive subject matter the first battery need not be limited to a 12V battery with a capacity of 60 A-hrs, and various alternative batteries are contemplated. For example, small vehicles such as motorcycles or jet skis may have a first battery that provides only 6V or 12V at a capacity of 20 A-hrs or less, while large vehicles may have even multiple batteries with 18–24V at a capacity of 100A-hrs and more. Thus, the absolute capacity of the first and second battery is not limiting, so long as the capacity of the second battery is smaller than the capacity of the first battery, and it is contemplated that the ratio of A-hr capacity of the first to the second battery is between 3:1 and 10:1, more preferably between 10:1 and 200:1.

Figure 2:
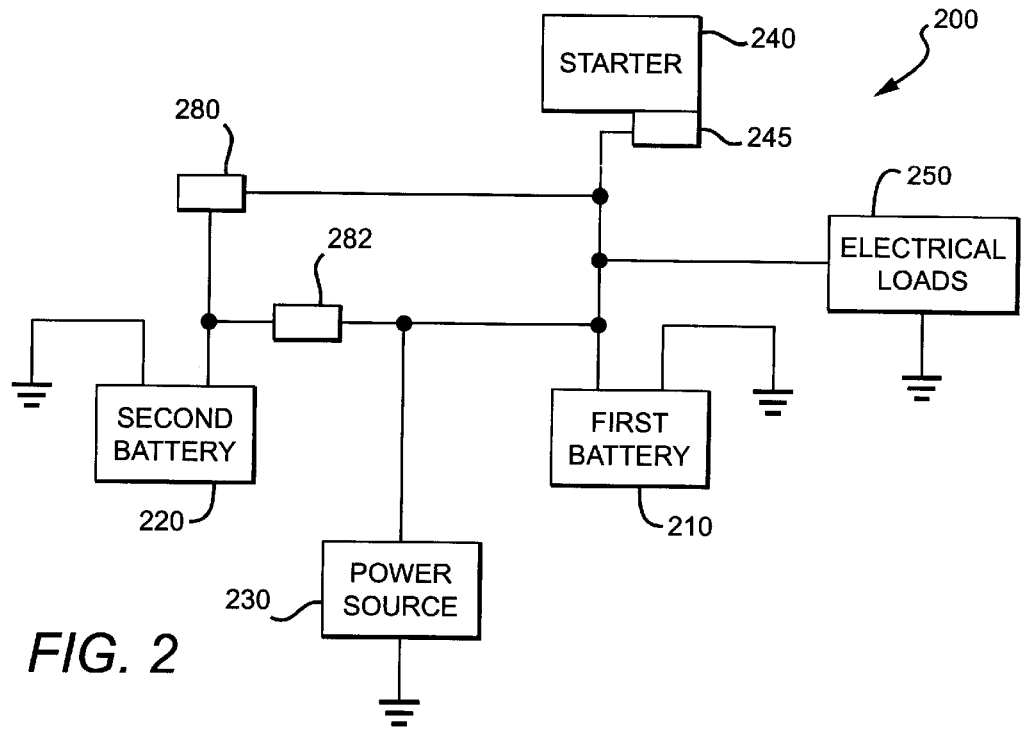
FIG. 2 is a schematic of another power and starter system according to the inventive subject matter.

In FIG. 2 a vehicle power and starting system 200 has a first battery 210 and a second battery 220. Both batteries are charged by power source 230, and are electrically coupled to a starter 240 via starter solenoid 245. A charge control circuit 282 controls charging of the second battery, while a control solenoid controls discharge of electrical power from the second battery to the starter. Electric loads 250 are coupled to the first battery.

Figure 3:
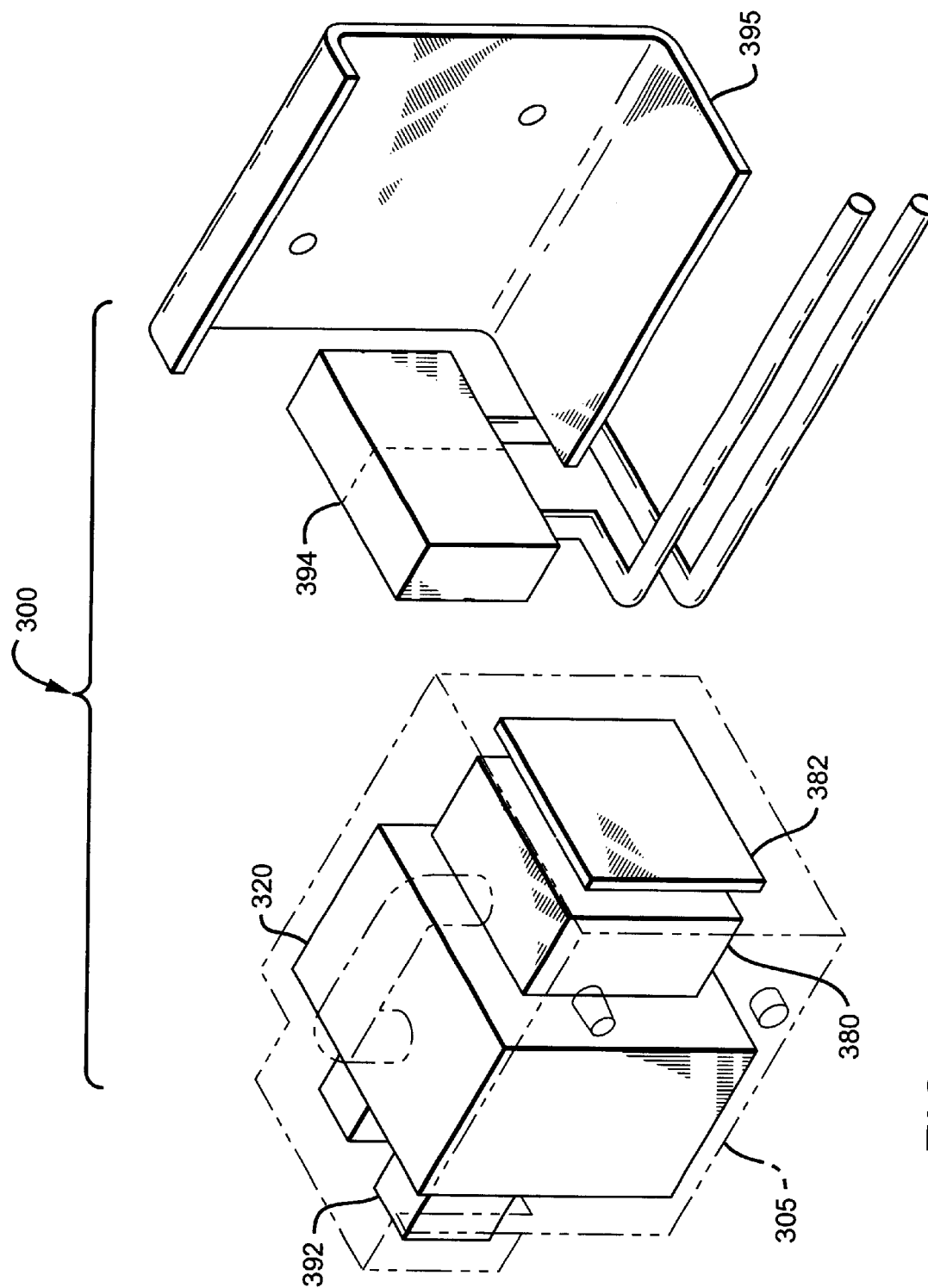
FIG. 3 shows an auxiliary power storage device according to the inventive subject matter

FIG. 3 shows one embodiment of an auxiliary power storage device 300 according to the inventive subject matter. The power storage device has a housing 305, a second battery 320, a solenoid 380, a control circuit 382, and first contact 392. A mounting harness 395 is sized and dimensioned to receive the housing, and a second contact 394 is sized and dimensioned to receive the first contact.

Thus, specific embodiments and applications of a vehicle power and starter system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A vehicle power and starer system for use in operating a motor vehicle, the motor vehicle having an on-board power source, a starter, and a plurality of electrical loads other than the starter, comprising:

a first battery electrically coupled to the starter and the plurality of electric loads;

a second battery electrically coupled to the starter, a flow control means, and at least one of a switch and a solenoid, and electrically isolated from the electric loads in the vehicle;

wherein both the first and the second batteries are charged by the power source in a first configuration; and wherein the second battery, the flow control means and the at least one of the switch and the solenoid are electrically disconnected and removed from the motor vehicle in a second configuration.

2. The starter system of claim 1 further comprising a connector having a first contact, and second contact, wherein the first contact is removably coupled to the second contact, wherein the first contact is electrically coupled to the second battery, and the second contact is electrically coupled to the starter; and wherein the second battery is electrically coupled to the starter when the first contact is matingly connected to the second contact.

3. The starter system of claim 2 further comprising a housing that at least partially encloses the second battery, and the first contact.

4. The starter system of claim 3 further comprising a solenoid electrically coupled to the second battery.

5. The starter system of claim 4 further comprising a control circuit electrically coupled to the second battery and the solenoid wherein the control circuit disables the solenoid when the voltage of the second battery drops below a predetermined voltage.

6. The starter system of claim 5 wherein the housing at least partially encloses the second battery, the first terminal, the solenoid, and the control circuit.

7. The system of claim 2 wherein the power source comprises an alternator.

8. The system of claim 2 wherein the second battery has a rated capacity of between 1 and 10 start cycles for the vehicle.

9. The system of claim 2 wherein the second battery comprises a thin metal film battery.

10. The system of claim 9 wherein the thin metal film battery has a capacity of 5 A-hr.

11. The system of claim 9 wherein the thin metal film battery has a capacity of 2.5 A-hr.

12. The system of claim 9 wherein the thin metal film battery has a capacity of 1 A-hr.

13. The system of claim 2 further comprising a manually operated high current switch in line between the second battery and the starter.

14. The system of claim 2 further comprising circuitry that allows to concurrently charge the first and the second batteries.

15. The system of claim 2 wherein the motor vehicle is selected from the group consisting of an aircraft, a passenger vehicle, a tractor, a boat, and a truck.

* * * * *